United States Patent [19]

Lee

[11] Patent Number: 4,465,806

[45] Date of Patent: Aug. 14, 1984

[54] UNSATURATED POLYESTER MOLDING COMPOUNDS WITH IMPROVED RESISTANCE TO THERMAL AND HUMID AGING

[75] Inventor: Chung J. Lee, Sheboygan, Wis.

[73] Assignee: Plastics Engineering Company, Sheboygan, Wis.

[21] Appl. No.: 466,859

[22] Filed: Feb. 16, 1983

Related U.S. Application Data

[63] Continuation-in-part of Ser. No. 299,787, Sep. 8, 1981, abandoned.

[51] Int. Cl.$^3$ .................. C08L 63/10; C08L 67/06
[52] U.S. Cl. ........................... 525/31; 525/28; 525/488; 525/531; 525/922
[58] Field of Search .............. 525/28, 31, 488, 531, 525/922

[56] References Cited

U.S. PATENT DOCUMENTS

| | | | |
|---|---|---|---|
| 3,256,226 | 6/1966 | Fekete | 525/531 |
| 3,301,743 | 1/1967 | Fekete | 525/531 |
| 3,524,901 | 8/1970 | Najvar | 525/31 |
| 3,574,794 | 4/1974 | Hargis | 525/31 |
| 3,586,528 | 6/1971 | Labana | 525/31 |
| 3,586,530 | 6/1971 | Aronoff | 525/31 |
| 3,793,398 | 2/1974 | Hokamura | 525/65 |
| 3,808,114 | 4/1974 | Tsuchihara | 525/31 |
| 3,882,187 | 5/1925 | Takiyama | 525/31 |
| 3,968,016 | 7/1976 | Wismer | 525/31 |
| 4,293,659 | 10/1981 | Svoboda | 525/31 |
| 4,336,344 | 6/1982 | Craigie | 525/531 |
| 4,336,359 | 6/1982 | Messick | 525/922 |
| 4,348,427 | 9/1982 | Priola | 525/922 |
| 4,390,662 | 6/1983 | Ando | 525/28 |
| 4,422,996 | 12/1983 | Navin | 525/922 |

*Primary Examiner*—Paul Lieberman
*Attorney, Agent, or Firm*—Walter J. Monacelli

[57] ABSTRACT

The compositions disclosed herein comprise a mixture of:

(1) An unsaturated polyester resin; such as the polymeric ester of maleic acid or anhydride and a glycol such as ethylene glycol; and (2) The reaction product of a polyepoxy compound, such as the diglycidyl ether of bisphenol-A, and an unsaturated monocarboxylic acid, such as acrylic or methacrylic acid, in which reaction product there remains unreacted at the time of mixing with said polyester resin at least 5 percent of the original epoxy groups of said polyepoxy compound.

This mixture when molded or cured gives improvement with respect to thermal and humid aging as compared to similar compositions in which the epoxy groups of said reaction product are substantially all reacted prior to mixture with said unsaturated polyester resin. The flexural strength, in particular, of the compositions are better retained on aging without adverse effect on other properties.

8 Claims, No Drawings

UNSATURATED POLYESTER MOLDING COMPOUNDS WITH IMPROVED RESISTANCE TO THERMAL AND HUMID AGING

This application is a continuation-in-part of application Ser. No. 299,787, filed Sept. 8, 1981 and now abandoned.

BACKGROUND OF THE INVENTION

1. Field of the Invention

This invention relates to polymerizable, curable compositions. More specifically, it relates to molding compositions comprising an unsaturated polyester resin and the reaction product of a polyepoxy compound with an unsaturated monocarboxylic acid. Still more specifically, it relates to such compositions in which at least 5 percent of the original epoxy groups remain free or unreacted at the time of mixing with said polyester.

2. State of the Prior Art

In the prior art of unsaturated polyester technology, new formulation studies have been made in the development of solid molding compounds. An important feature is continuous processing and utilization via injection and transfer molding.

In order to prepare solid powder, or granular molding compounds, a solid unsaturated polyester resin has to be mixed with a solid or liquid reactive monomer. In the first case, the formulations are often limited by the availability of solid reactive monomers. Also, the use of a solid monomer in a matrix system can sometimes impose a limitation on the loadability of the matrix system, in particular, for some very finely divided reinforcing fillers. For instance, when the melting temperature of the matrix system is very close to the curing temperature or the molding temperature of the system, the wettability of such fillers is often found inadequate in such matrix system, and the product made from such composition shows poor resistance to thermal or humid aging.

The use of low boiling liquid vinyl monomer, such as styrene, as crosslinker is common in the production of sheet molding and bulk molding compounds. Even though this polyester/vinyl monomer system cures fast and provides good properties, it does have several drawbacks in that the vinyl monomer is often very volatile under processing conditions. In addition, the exotherm temperatures during curing are quite high, which often results in micro-cracks in the final product. It is also believed in the art that the shrinkage of the cured product is inversely proportional to the molecular weight of these vinyl monomers. It is thus advantageous to use a high molecular weight reactive monomer, with higher boiling temperature. In particular, the use of low boiling liquid, reactive vinyl monomer, such as styrene, is often found inadequate in making solid powder or granular molding compounds.

A number of patents have shown the use of the reaction product of a polyepoxy compound, such as the diglycidyl ether of bisphenol-A, with acrylic or methacrylic acid in combination with an unsaturated polyester resin to produce a matrix resin. However, in each of these patents, it is indicated, either specifically or by the excess of acid used, that this reaction product has substantially no free or unreacted epoxy groups when this product is added to the unsaturated polyester resins.

These patents are: Netherland Pat. No. 67-10103 (issued in 1969 to H. H. Robertson Company); and U.S. Pat. Nos. 3,506,736, 3,621,093, 3,825,517 and 3,968,016. As stated above, none of these references indicate that the polyepoxy reaction product with acrylic or methacrylic acid has any amount of free or unreacted epoxy groups.

SUMMARY OF THE INVENTION

In accordance with the present invention, it has been found that aging properties are improved, without adverse effect on other properties in a molding composition comprising a mixture of 60–95 percent by weight of resin and 5–40 percent, preferably 10–30 percent by weight of the reaction product of a polyepoxy compound with an unsaturated monocarboxylic acid, in which reaction product there remains at least 5 percent of the epoxy groups unreacted. The presence of these free epoxy groups effects improvement in aging properties in the subsequently molded or cured product.

The unsaturated polyester may be any polyester containing a substantial content of double bonds which are curable by known methods to form a crosslinked network structure. For example, the polyester can be one of the structure:

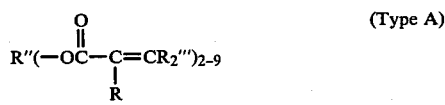

(Type A)

wherein each R may be alike or different and selected from hydrogen, $CH_3$ or a halogen; R" is a polyvalent aliphatic, cycloaliphatic or aromatic radical, preferably hydrocarbon, having a valency of 2 to 9, and R''' is hydrogen or a monovalent hydrocarbon radical of 1–30 carbon atoms; or the polyester may be one having a repeating unit of the structure:

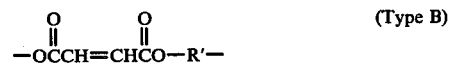

(Type B)

wherein R' is a divalent hydrocarbon radical of the type described for R" but having a valency of 2 and may also be the residue of a polyglycol after removal of the terminal hydroxy groups; or the polyester may be a urethane-modified polyester having the formula:

(Type C)

wherein R" and R''' are as defined above, Ar is a divalent aromatic radical, and x and y are integers having a value of 1–4, preferably 2–3; or a urethane-modified polyester having the formula:

(Type D)

wherein R' and Ar are as defined above, and n and m are integers having values of 1–15, preferably 2–10. While the respective repeating units have been inserted in one bracket each, it is contemplated that they may be spread individually or in bunches throughout the polyester molecule. For example, where n has a value of 6 and m has a value of 1, the distribution may be 3-1-3; or where n is 6 and m is 2, the distribution may be 2-1-2-1-2.

A number of suitable unsaturated polyesters are commercially available. For example, Type A resin available commercially is the Derakane Bisphenol-A base or Novolac base unsaturated esters of the Dow Company; Type B unsaturated polyester is available as the Pioneer P286 and P142 resins. The P286 resin has a weight average molecular weight of about 4200 and is made from fumaric acid, propylene glycol and cyclohexanedimethol used in molar proportions of 4:3:1, respectively. The P142 resin also has a molecular weight of about 4200 and is made from fumaric and isophthalic acids in molar proportions of 2.71 to 1 respectively with propylene glycol and cyclohexanedimethanol in molar proportions of 3.1 to 1, respectively, with the total acid being used approximately in equimolar proportion to the total glycol. Urethane-modified type resin is available as ICI's Atlac 580 resin.

The weight average molecular weight for the unsaturated polyester may be in the range of 500 to 50,000, depending on the type of polyester. For example this may be from 500 to 25,000, preferably from 1,000 to 5,000 when a polyester of Type A or Type C is used; or from 1,000 to 50,000, preferably from 2,500 to 7,500 when a Type B polyester is used; or from 3,000 to 75,000, preferably from 5,000 to 20,000 when a Type D polyester is used.

The proportion of crosslinker, namely the acrylate or other unsaturated ester of the polyepoxy compound, is within the range of 5–40 percent by weight, preferably 10–30 percent by weight based on the combined weight of crosslinker and unsaturated polyester, depends somewhat on the character of the crosslinker, one condition being the percent of free epoxy groups therein. Moreover, since the crosslinker has its own unsaturation, there is no problem created by having an excess thereof.

The unsaturated ester of the polyepoxy compound is derived by the reaction of an unsaturated monocarboxylic acid such as acrylic acid. The polyepoxy compound may be represented as

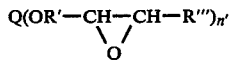

wherein Q is a polyvalent organic moiety having a valency corresponding to the value of n', R''' is hydrogen or a monovalent hydrocarbon radical of 1–30 carbon atoms, and n' is an integer having a value of 2 to 30, preferably 2–10. The monocarboxylic acid is reacted according to the following reaction:

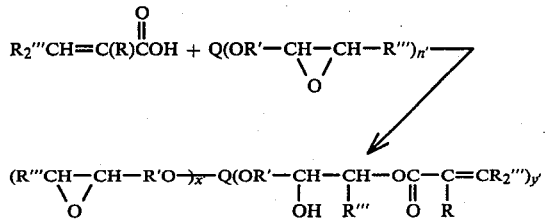

wherein x' and y' are integers, the sum of which equals n' and x' represents at least 5 percent of n'. In some cases, such as where n' has a low value, such as in the diglycidyl ether of bisphenol-A in which n' has a value of 2, all of the epoxy groups in a number of molecules of the diglycidyl ether are reacted with the acid molecules and the five percent or more is represented by a free epoxy group in a fewer number of the glydicyl ether compounds. For example, where GQG represents the diglycidyl compound and A-G-A represents the diester derivative, there may be a mixture of G-Q-A and A-G-A derivatives in which G-Q-A represents 5% or more, preferably no more than 20% of the original G-Q-G groups. Thus one G-Q-A group with 9 A-Q-A groups would give one G group left with 19 A groups to give 1 out of 20 or 5%.

Thus the product from the diglycidyl ether of bisphenol-A and acrylic acid could be 1-4 moles of:

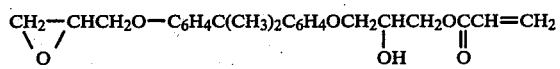

and 9-6 moles of:

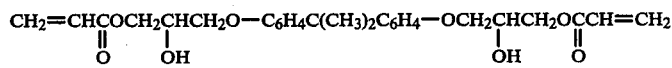

The polyepoxy compounds are derived from polyhydroxy compounds which may be represented by Q(OH)$_{n'}$ in which Q and n' are as defined above. Typical suitable polyhydroxy compounds include bisphenol-A (also known as 2,2-bis(4-phenylol)propane), 2,2-bis(4-phenylol)-methane, hydroquinone, resorcinol, catechol, 4,4'-dihydroxy-diphenyl, 4,4'-dihydroxydiphenyloxide, 4,4'-dihydroxydiphenylsulfide, the 3,3' and 2,2' dihydroxy compounds corresponding to the above 4,4' compounds; glycerine, pentaerythritol, ethylene glycol, polyethylene or polyproylene glycol (HO(CH$_2$CH$_2$O)$_{2-30}$ or HO(CH$_2$CH(CH$_3$)O)$_{2-30}$ etc.

In the above formulas where R is defined as hydrogen, halogen or a methyl group, the halogen may be Br, I, F but is preferably Cl, and where R''' is defined as hydrogen or a monovalent hydrocarbon radical, the hydrocarbon radical may be aliphatic, aromatic, cycloaliphatic and combinations of such radicals, including those which have ethylenic or acetylenic unsaturation therein.

The hydrocarbon groups may have attached thereto any group that will not interfere with the preparation and functions of the compounds of this invention as described herein. Preferably these groups are hydrocarbon, or a multiplicity of hydrocarbon groups joined by ether, sulfide, ester and sulfonyl groups such as —O—, —S—, —COO—, —OOC—, —S(O)$_2$—, etc.

Typical monovalent hydrocarbon groups suitable as R''' in the above formulas include: —$CH_3$, —$C_2H_5$, —$C_3H_7$, —$C_4H_9$, —$C_6H_{13}$, —$C_{10}H_{21}$, —$C_{18}H_{37}$, —$C_6H_{11}$, —$C_5H_9$, —$C_5H_9CH_3$, —$C_6H_{10}C_2H_5$, —$CH_2C_6H_{11}$, —$CH_2CH_2C_6H_{11}$, —$C_6H_6$, —$C_6H_4CH_3$, —$C_6H_4C_3H_7$, —$C_6H_3(CH_3)_2$, —$C_6H_5OCH_3$, —$C_6H_4OC_2H_5$, —$C_6H_4SCH_3$, —$C_6H_4OOCCH_3$, —$C_6H_4SO_2C_6H_5$, —$C_6H_4SO_2C_6H_4CH_3$, —$C_6H_4SO_2C_6H_5$, —$C_6H_3(CH_3)OC_3H_7$, —$C_6H_4OC_6H_4CH_3$, —$C_{10}H_8$, —$C_{10}H_7CH_3$, —$C_{10}H_7C_2H_5$, —$C_{10}H_6(CH_3)_2$, —$C_{10}H_6OCH_3$, —$C_{10}H_6OOCCH_3$, —$(C_6H_4)_3C_3H_7$, —$(C_6H_4)_3OC_4H_9$, —$(C_6H_4)_3(OC_6H_5$, —$C_6H_4(OCH_2CH_2)_2H$, —$C_6H_4(OCH_2CH_2)_3H$, —$(C_6H_4O)_3C_3H_7$, —$CH_2CH_2OCH_2CH_2)_2H$ —$CH_2CH_2(OCH_2CH_2)_3OOCCH_3$, —$CH_2CH_2OC_6H_5$, —$CH_2CH_2OOCCH_3$ —$CH_2CH(CH_3)OOCC_6H_5$, —$C_6H_4COOC_2H_5$, —$CH_2COOC_6H_5$, —$C_6H_4CH=CH_2$—, —$C_6H_3(CH_3)CH=CH_2$, —$C_6H_4C(CH_3)=CH_2$, —$C_6H_4C≡CH$, etc.

The divalent aromatic radical Ar is preferably hydrocarbon but can contain additional groups which will not interfere with the various reactions involved in the preparation and use of the products of this invention.

These are divalent benzenoid radicals advantageously selected from the group consisting of:

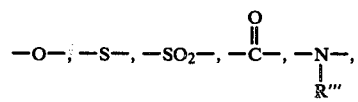

and multiples thereof connected to each other by Z, for example:

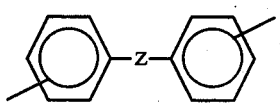

wherein Z is an alkylene chain of 1-3 carbon atoms, —CH=CH— or:

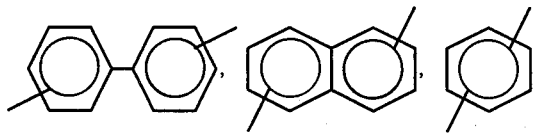

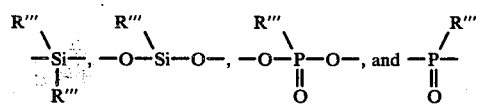

wherein R''' is selected from the group consisting of alkyl and aryl groups of 1-20, preferably 1 to 7 carbon atoms. Ar is preferably:

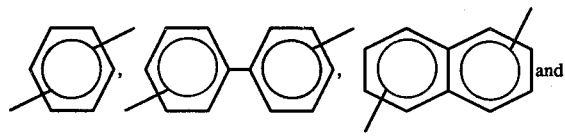

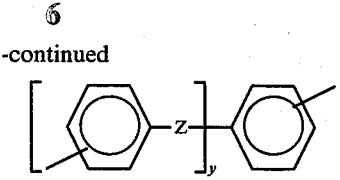

where Z is an alkylene chain of 1-3 carbon atoms, $$-\overset{O}{\overset{\|}{C}}-, -O-, -S-, -CH=CH-, -SO_2-,$$

and y is 1 to 3. Particularly preferred for Ar and Ar' is the

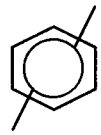

radical.

The divalent groups R' and R", in addition to the divalent Ar groups illustrated above, include groups similar to those listed above for R''' in which a hydrogen atom has been removed to provide a second valency. Preferred R' and R" divalent groups are —$CH_2$—, —$CH(CH_3)$—; —$(CH_2)$—$_{2-6}$; —$CH_2CH(CH_3)$—; —$C_6H_{10}$—; —$(CH_2CH_2O)$—$_{2-9}$; etc. Also for higher valent R" groups, preferred radicals are

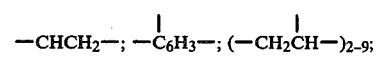

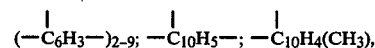

etc.

The crosslinking agents of this invention may be prepared in several ways. For example, the preparation may be conducted with a limited amount of the unsaturated carboxylic acid so that sufficient epoxy groups remain unreacted. Then any amounts of acid remaining are removed by vaporization under vacuum and the product analyzed to determine the amount of epoxy and unsaturated acid groups.

In another method, better designed for accurate control of the proportions of components, the diester of the unsaturated acid with the diepoxy is made separately and the monoester is also made separately and the two compounds mixed in appropriate proportions to give the desired free or unreacted epoxy content.

In preparing the polyester crosslinker mixtures of this invention, various known methods used for mixing materials of generally similar properties may be applied such as milling, extruding, etc.

Polymerization products of the present invention have application in a wide variety of physical shapes and forms, including use as molding compounds, films, coatings, etc. The unusual heat stability and resistance to heat and to humid conditions in the cured state makes these compositions especially unique. When made into molded products or used as films, these polymers, including laminated products prepared therefrom, not only possess excellent physical properties at room temperature, but they retain their strength and excellent response to work-loading at elevated temperatures for long periods of time.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

Preparation of the Monoacrylate Component or the Epoxyacrylate Compound (85CP)

Into a 500 ml round bottom flask equipped with a stirrer, heating mantle, condenser and thermometer is charged 253 g of 4,4'-isopropylidenediphenolepichlorohydrin epoxy (also known as the diglycidyl ether of bisphenol-A) which has an epoxy equivalent weight of about 185–196 g (sold by Union Carbide Corporation as Araldite 6010), 86 g of methacrylic acid, 0.5 g of 1,4-diazobicyclo[2,2,2] octane (as catalyst), and 0.1 g of hydroquinone (as polymerization inhibitor). The reaction is carried out at temperatures from 110° to 120° C. for about two hours. After reaction, the unreacted methacrylic acid is removed by applying vacuum at 50° to 60° C. of the product temperature. A Gel Permeation Chromatographic trace of this reaction product shows the product consisting predominantly (>98%) of monomethacrylate of bisphenol-A-epichlorohydrin epoxy. This product is designated as 85CP.

EXAMPLE II

Preparation of the Diacrylate of the Diglycidyl Ether of Bisphenol-A (a) This diacrylate is prepared from a commercial product Epocryl E480 marketed by the Shell Company which is a 40% styrene solution consisting predominantly of the diacrylate of the diglycidyl ether of Bisphenol-A having the structure:

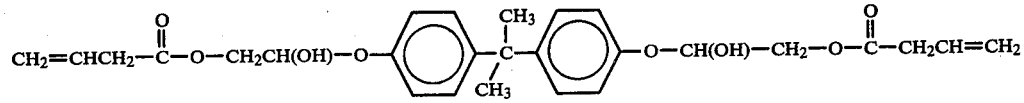

The styrene is stripped from the solution by applying a vacuum of about 29 mm Hg at a temperature of about 40°–50° C. A gel permeation chromatographic trace of the product shows it consists primarily of a single component, which is identical with the compound shown above; and a minor amount of high molecular weight resin which is practically free from unreacted epoxy groups. This stripped product is designated herein as E48OP.

(b) According to the procedure of Example 10 of U.S. Pat. No. 3,825,517: The reaction of 252 g of Araldite 6010 (the diglycidyl ether of bis-phenol-A having an epoxy-equivalent weight of about 185–196 g) with 112 g of methacrylic acid in the presence of 5 g of a 60% water solution of benzyltrimethylammonium chloride with 0.25 g of hydroquinone is conducted at 75° to 83° C. for about 9 hours until the acid number of the product is about 10. A gel permeation chromatographic trace of this product shows it is identical with the E48OP of Example IIa and consists predominately of the diacrylate with a minor amount of higher molecular weight resin. The infrared spectrum of this product shows it is practically free from any unreacted epoxy group, which has an absorption band at 920 cm−1.

EXAMPLE III

Preparation of the Crosslinking Composition 85C of this Invention (a) The 85CP prepared according to the above Example I is mixed with the E48OP of Example IIa to form a mixture which, as analyzed by GPC, shows the product consists of about 35% of the monoacrylate-epoxy and about 60% of the Bisphenol-A-diglycidyl diacrylate and a small amount of high molecular weight resin. This product is designated as 85C. The epoxy content calculates to about 18.4% of what could be considered the original epoxy content.

(b) Into a 2500 ml round bottom flask equipped with a stirrer, heating mantle, condenser and thermometer, is charged 680 g of 4,4'-isopropylidenediphenolepichlorohydrin (also known as the diglycidyl ether of bisphenol-A), which has an epoxy equivalent weight of about 185–196 g (sold by Union Carbide as Araldite 6010); 430 g of methacrylic acid; 2.5 g of 1,4-diazobicyclo[2,2,2] octane (as esterification catalyst); and 0.5 g of hydroquinone (as polymerization inhibitor). The reaction is carried out at temperatures from 110° to 120° C. for about three hours. After this reaction period, the unreacted methacrylic acid is removed by applying a vacuum of about 27 mm Hg at 90° to 100° C. A Gel Permeation Chromatographic trace of the final product shows the product consisting of about 65% of the diacrylate and 35% of the monoacrylate of the starting epoxy compound. This product is also designated as 85C.

EXAMPLE IV

A series of molding compositions are prepared comprising specific proportions respectively of the following unsaturated polyesters:
Pioneer P286 resin of Type B 96-52B* (Urethane-modified Pioneer P142 resin of Type B)
and specific proportions of various crosslinkers comprising:
DAP (diallyl phthalate—a crosslinker commonly used commercially)
Epocryl E480 marketed by Shell Company
85C prepared as in Example IIIa

*-96-52B is a urethane-modified P142 resin prepared by adding to the P142 resin a mixture of polytetramethylene glycol (molecular weight of 600) and ethylene glycol (1:1 mole ratio) and methylene diisocyanate and toluene diisocyanate, (1:4 molar ratio) with 1.04 moles of glycol used per mole of diisocyanate, and 3.1 moles of P142 used per mole of diisocyanate. The components are mixed together with 0.01 mole percent of triethylene diamine based on the diisocyanate at 140° C. to 150° C. for 30 minutes under a nitrogen atmosphere. The P142 resin has a weight average molecular weight of about 4200 and the modified product has a weight average molecular weight of about 15,000.

The molding compositions comprise: 25.5 parts of the unsaturated polyester; 3.83 parts of the crosslinker; 1.37 parts of 50% dicumyl peroxide-coated clay (Di-Cup 40KE); 2 parts of calcium stearate; 18.3 parts of ⅛" fiberglass; and 35 parts of calcium carbonate. These components are mixed in a Jay-Go mixer in the following order: the polyester and crosslinker are added followed by the $CaCO_2$ and Ca stearate in that order, mixed at 270° F. for 3 minutes; then the fiberglass is added and mixing continued at 270° F. for another 3 minutes following which the Di-Cup is added and final mixing continued at 270° F. for another 3 minutes. The compositions are transfer molded and then tested for various properties which are reported below in Tables I and II. The molded pieces are 5"×½"×⅛" and are molded at 330° F. for 3 minutes at a pressure of 100–200 psi. The aging in high humidity chamber is conducted at room temperature for various periods at 85% humidity.

TABLE I

| AGING IN HIGH HUMIDITY CHAMBER (85% at Room Temp.) | | | | | |
|---|---|---|---|---|---|
| Polyester | Crosslinker | 0 hrs. | 1 wk. | 2 wks. | 4 wks. |
| | | Flexural Strength (psi) | | | |
| 96–52B | DAP | 17,900 | 13,700 | 12,600 | 13,000 |
| 96–52B | 85C | 17,500 | 16,200 | 14,000 | 15,700 |
| | | Flexural Modulus (psi) | | | |
| 96–52B | DAP | 1,230 | 1,190 | 1,090 | 1,180 |
| 96–52B | 85C | 1,430 | 1,270 | 1,070 | 1,180 |
| | | Unnotched Izod (ft.-lb./in.$^2$) | | | |
| 96–52B | DAP | 11.4 | 4.8 | 3.8 | 2.9 |
| 96–52B | 85C | 12.9 | 5.2 | 4.4 | 5.0 |
| | | Notched Izod (ft.-lb./in.) | | | |
| 96–52B | DAP | 1.80 | 1.14 | 0.98 | 1.10 |
| 96–52B | 85C | 1.80 | 1.60 | 1.40 | 1.30 |

TABLE II

| AGING IN HIGH TEMPERATURE OVEN (170° C.) | | | | | |
|---|---|---|---|---|---|
| Polyester | crosslinker | 0 hrs. | 8 hrs. | 8 days 16 days | 3 mos. |
| | | Flexural Strength (psi) | | | |
| P286 | DAP | 11,900 | 10,000 | 9,000 | 2,900 |
| P286 | 85C | 10,400 | 12,000 | 12,000 | 8,900 |
| | | Flexural Modulus (psi) | | | |
| P286 | DAP | 1,280 | 1,200 | 1,400 | 820 |
| P286 | 85C | 1,400 | 1,600 | 1,700 | 1,300 |
| | | Weight Loss (percent) | | | |
| P286 | DAP | 0 | 1.66 | 3.52 | 16.6 |
| P286 | 85C | 0 | 0.44 | 0.67 | 7.1 |

Similar results are obtained when the diacrylate for the preparation of 85C is that of Example IIb instead of that of Example IIa. Similar results are also obtained when the 85C used is that prepared according to the procedure of Example IIIb.

EXAMPLE V

The procedure of Example IV is repeated using a mixture of 1 part P286 and 1 part P12685F as the polyester resin mixture. The molded product is tested for the effect of high humidity aging on the flexural strength using an atmosphere of 85% humidity at room temperature with the results shown in Table III.

TABLE III

| Crosslinker | As Molded | Aging for 7 days | Aging for 24 days |
|---|---|---|---|
| E480P | 22,500 | 20,400 | 17,400 |
| 85C | 22,700 | 21,400 | 19,700 |

EXAMPLE VI

Compositions are formulated, molded and tested for Notched Izod. The formulations comprise 143 parts of the resin-crosslinker mixture; 66 parts fiberglass; 54.2 parts of mica; 40 parts of polyester fiber; 5 parts of Di-Cup; and 175 parts of $CaCO_3$ with the result showing favorable or no adverse effect with the 85C crosslinker.

TABLE IV

| Polyester | Crosslinker | Wt. % Crosslinker | Notched Izod (ft.lb./in) |
|---|---|---|---|
| P286 | DAP | 12.5 | 2.55 ± 0.33 |
| P286 | 85C | 12.5 | 2.52 ± 0.32 |
| P286 | DAP | 20.0 | 3.39 ± 0.31 |
| P286 | 85C | 20.0 | 3.27 ± 0.23 |
| P286 | 85C | 30.0 | 3.20 ± 0.30 |
| P286 | 85C | 40.0 | 3.85 ± 0.18 |
| P286 | 85C | 100.0 | 4.22 ± 0.17 |

EXAMPLE VII

The procedure of Example IV is repeated several times with combinations of P286 and P12685F polyester resins. The P12685F resin has a weight average molecular weight of about 4,000 and is a copolyester of propylene glycol with fumaric and isophthalic acids in a molar proportion of 2.7 to 1, respectively. These resins are used in a weight proportion of 2.4 parts P286 to one part of P12685F and the effect of temperature tested on the molded products with the following results:

TABLE V

| | Flexural Strength (psi) | | |
|---|---|---|---|
| Crosslinker | As Molded | 170° C./3 months | 170° C./5 months |
| E480P | 19,000 | 14,600 | 13,500 |
| 85C | 20,400 | 17,400 | 17,100 |

EXAMPLE VIII

The procedure of Example IV is repeated a number of times with similar improved results using as the crosslinker:

(a) the same as used in Example IV except that the proportion of epoxy content is 12% calculated on the original content;

(b) the same as used in Example IV except that the proportion of epoxy content is 25% calculated on the original content;

(c) the diglycidyl ether of hydroquinone in which 80% of the epoxy groups are reacted with methacrylic acid to give an epoxy content of 20% calculated on the original content;

(d) the diglycidyl ether of 4,4'-diphenyl-methane in which 85% of the epoxy groups are reacted with beta-chloracrylic acid to give a remaining epoxy content of 15%;

(e) the 1-butyl-3,4-epoxy ether of bisphenol-A in which 90% of the epoxy groups are reacted with acrylic acid to give a remaining epoxy content of 10%;

(f) the p-styryl oxide ether of bisphenol-A in which 85% of the epoxy groups are reacted with methacrylic acid to give a remaining epoxy content of 15%;

(g) the glycidyl ether of a Novolak phenol-formaldehyde resin having an average of ten phenol radicals per molecule with an average of 8 glycidyl groups attached as ether groups of which 7 have been reacted with acrylic acid to give a remaining epoxy content of about 14%.

EXAMPLE IX

The procedure of Example IV is repeated a number of times with similar improved results using as the unsaturated polyester resin an equivalent amount respectively of:

(a) a phenol-formaldehyde Novolak resin having an average of 8 phenol groups per molecule of which an average of 3 of the hydroxy groups per molecule have been reacted with acrylic acid to form acrylate ester groups;

(b) a glyceryl diacrylate reacted with toluene diisocyanate to form bis(diacrylylglyceryl)urethane;

(c) a Novolak resin as in paragraph (a) of this Example in which an unoccupied hydroxy group in a phenol molecule has been reacted with toluene diisocyanate to give a urethane derivative;

(d) a urethane-modified resin having the formula:

(e) a urethane-modified resin as in (d) above except that the —CH$_2$CH$_2$— groups have been replaced with —CH$_2$CH(CH$_3$)— groups and the —C$_6$H$_3$(CH$_3$)— groups have been replaced with —CH$_2$— groups.

The polyester compositions of this invention may be molded or cured by various known processes including compression; injection and transfer molding. The conditions for molding will vary according to the specific composition and type of molding. However, temperatures of at least 20° C., preferably 50°–180° C. are suitable with curing cycles of at least 2 seconds, and up to several days, preferably 10 seconds to 3 hours; and pressures varying from zero to 500 psi, preferably 100–300 psi, depending on: the melting temperature of the unsaturated polyester, which can be from room temperature to over 200° C.; the initiation temperature of the curing initiator, which can be from room temperature to over 200° C.; the use of an initiation promoter to further reduce the initiation temperature of an initiator; and the filler composition used.

There is generally no added advantage in going beyond 40 percent unreacted epoxy in the polyepoxy compound. Therefore the broad range of unreacted epoxy is 5–40 percent and the preferred range is 5–30 percent.

As indicated above it is desirable to have the compositions of this invention free of volatile vinyl monomer, such as styrene. For the purpose of this invention a volatile vinyl monomer is considered to be one having a boiling point of no more than 175° C., particularly no more than 150° C.

While certain features of this invention have been described in detail with respect to various embodiments thereof, it will of course be apparent that other modifications can be made within the spirit and scope of this invention, and it is not intended to limit the invention to the exact details insofar as they are defined in the following claims.

The invention claimed is:

1. A resin molding composition free of volatile vinyl monomer with a boiling point no more than 175° C. having improved aging properties after curing admixed only with a peroxide as curing agent consisting essentially of (1) 60–95 percent by weight of an unsaturated polyester having a weight average molecular weight of 500 to 50,000 and (2) 5–40 percent by weight of a crosslinker, said percentages being based on the combined weight of said polyester and said crosslinker, said crosslinker comprising the reaction product of a polyepoxy compound and an unsaturated monocarboxylic acid having the formula

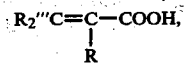

wherein the R group is selected from the class consisting of hydrogen, methyl and halogen, and R''' is hydrogen or a hydrocarbon radical having 1–30 carbon atoms, said reaction product having 5–40 percent of the original epoxy radicals remaining still unreacted at the time of addition of said crosslinker to said polyester and said unsaturated polyester having a repeating unit formula:

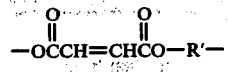

in which R' is a divalent hydrocarbon radical.

2. The resin composition of claim 1, in which said monocarboxylic acid is selected from the class consisting of acrylic and methacrylic acids.

3. The resin composition of claim 1 or 2 in which said polyepoxy compound is a polyglycidyl ether of an aromatic polyhydroxy compound.

4. The resin composition of claim 1 or 2 in which said polyepoxy compound is the diglycidyl ether of 2,2-bis(4-phenylol)-propane.

5. The resin composition of claims 1, 2 or 4 in which said polyester has a plurality of repeating units having the formula

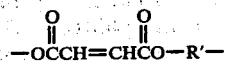

in which R' is a divalent hydrocarbon radical.

6. The resin composition of claim 5, in which R' represents —CH$_2$CH$_2$— or —CH$_2$CH(CH$_3$)—.

7. A process for preparing a cured polyester resin of improved aging properties comprising the steps of placing a composition of claim 1 admixed only with a peroxide as curing agent in a mold and molding the same at a temperature of 20°–180° C. for a period of at least 2 seconds and at a pressure of 0–400 psi.

8. A cured resin of improved aging properties prepared according to the process of claim 7.

* * * * *

UNITED STATES PATENT AND TRADEMARK OFFICE
CERTIFICATE OF CORRECTION

PATENT NO.   : 4,465,806
DATED        : Aug. 14, 1984
INVENTOR(S)  : Chung J. Lee It is certified that error appears in the above-identified patent and that said Letters Patent is hereby corrected as shown below:

In Col. 2, lines 51-53, in that portion of the formula reading " $\overset{}{\underset{y}{\rightarrow}}$ R"' ", correct " R"' " to read " R" ".

*Signed and Sealed this*

*Fifth* Day of *February 1985*

[SEAL]

*Attest:*

DONALD J. QUIGG

*Attesting Officer*   *Acting Commissioner of Patents and Trademarks*